(12) United States Patent
Andronica

(10) Patent No.: US 6,929,433 B2
(45) Date of Patent: Aug. 16, 2005

(54) DRILL AND SURFACE INSENSITIVE STARTING DRILL FOR DIFFICULT MATERIALS AND DEEP HOLES

(76) Inventor: Randall C. Andronica, 1815 Coleman St., Brooklyn, NY (US) 11234

( * ) Notice: Subject to any disclaimer, the term of this patent is extended or adjusted under 35 U.S.C. 154(b) by 398 days.

(21) Appl. No.: 09/974,472

(22) Filed: Oct. 10, 2001

(65) Prior Publication Data

US 2002/0044844 A1  Apr. 18, 2002

Related U.S. Application Data

(60) Provisional application No. 60/239,699, filed on Oct. 12, 2000.

(51) Int. Cl.[7] .............................................. B23B 51/00
(52) U.S. Cl. ..................... 408/228; 408/226; 408/227
(58) Field of Search .............................. 408/144, 199, 408/226, 227, 228; 82/150, 170

(56) References Cited

U.S. PATENT DOCUMENTS

| | | |
|---|---|---|
| 1,519,786 A | 12/1924 | McCormick |
| 1,545,030 A | 7/1925 | Best |
| 1,964,030 A | 6/1934 | Brush |
| 2,174,389 A | 9/1939 | Poletis |
| 2,260,288 A | 10/1941 | Black |
| 2,404,048 A | 7/1946 | Gepfert |
| 2,404,049 A | 7/1946 | Gepfert |
| 2,640,379 A | 6/1953 | Graves |
| 2,878,809 A | 3/1959 | Treace |
| 2,889,725 A | 6/1959 | Turton et al. |
| 2,977,828 A | 4/1961 | Strickland |
| 3,121,351 A | 2/1964 | Mount |
| 4,157,714 A * | 6/1979 | Foltz et al. .................... 606/72 |
| 5,002,439 A | 3/1991 | Lauder |
| 5,516,242 A | 5/1996 | Andronica |
| 5,641,251 A | 6/1997 | Leins et al. |
| 5,664,914 A * | 9/1997 | Taniguchi ................... 408/199 |
| 6,030,156 A | 2/2000 | Andronica |

FOREIGN PATENT DOCUMENTS

| | | | | |
|---|---|---|---|---|
| DE | 338875 | * | 12/1919 | ................. 408/227 |
| DE | 947062 | * | 7/1956 | ................. 408/224 |
| DE | 19856395 | * | 8/2000 | ........... B23B/51/00 |
| JP | 57112 | * | 3/1998 | ................. 408/225 |
| RU | 1741978 | * | 6/1992 | ................. 408/227 |

* cited by examiner

*Primary Examiner*—Daniel W. Howell
(74) *Attorney, Agent, or Firm*—Galgano & Burke, LLP (57) ABSTRACT

A fluteless pyramid point drill for spotting holes for drills having an included angle from 90–160°. The preferred tool is double ended. Another embodiment features the pyramid point on the back end of a penetrating drill. An enhanced pyramid point geometry enables construction from technical ceramics. These embodiments included a notched pyramid, a dual pyramid, a beveled pyramid, and an eccentric pyramid. Another embodiment utilizes a grooved-body hollow pyramid for reaming holes. Geometries for a single sided penetrating drill for drilling hardened materials include a limited flute with a flute depth of ⅓ the drill diameter. Point angle embodiments include a 0–20° primary cutting edge and a steeper relief angle with a negative rake along the edge, a radial edge and steep relief angle with a negative rake along this edge. Additionally a pyramid point may be superimposed on the dual point angle for superior centering guidance.

14 Claims, 4 Drawing Sheets

DRILL AND SURFACE INSENSITIVE STARTING DRILL FOR DIFFICULT MATERIALS AND DEEP HOLES

This application claims priority on Provisional Patent application No. 60/239,699 filed Oct. 12, 2000.

BACKGROUND OF INVENTION

The current invention is related to improvements in drill bits. And more particularly, it is related to improvements in drills for accurately starting a hole to be followed by the finishing drill. Additionally, a drill geometry is defined for a drill capable of drilling through difficult or hardened materials.

Drilling is one of the most common operations to be performed in a machine ship. As drills commonly have a large length to diameter ratio, the common accepted practice is to either center drill, center punch or to utilize a spotting drill prior to drilling to prevent the subsequent drill from walking off its location. The use of center drills, however, is limited to applications where the tool is perpendicular to the surface, as they are not particularly effective on inclined, angular, fractured, or off center curved surfaces, especially in small sizes or as the work material increases in hardness. Additionally, if a hole is started in the wrong position, it is very difficult to get the drill to accurately start at the correct location.

And as well, materials are often encountered that are difficult to work with. This may lead to breakage of a drill, or more commonly, a tap in the workpiece. This can create a real problem to remove as the broken tool is itself made of a hardened material which defies conventional tools. In addition, the fractured surface of the tool is probably the most difficult surface in which to start a drill. Carbide tools have had limited success in drilling out these materials as the interrupted cut encountered wreaks havoc on brittle carbide, resulting in either fractured cutting edges or a broken tool. Additionally, restoring the cutting edges of these tools is not particularly easy and generally requires special equipment.

Industry has successfully solved the problem with the use of a non-traditional machining method known as electrical discharge machining. However, as the equipment is expensive, as is the hourly rate charge, most shops do not have the equipment and are faced with either scrapping the part or sending it out, incurring the added expense and loss of time. It is, therefore, desirable to be able to drill out these broken tools, especially as the workpiece may already be set up on the machine tool. And removal rates are much higher by drilling.

Then, too, there are non-metallic materials such as ceramics, granite, or glass that are difficult or "undrillable" with conventional drills, and these materials, being electrically non-conductive, are not candidates for EDM machining. The ability to modify such materials is highly desirable as the items would otherwise have to be produced from a green stage prior to heat treatment, which may often distort the part.

SUMMARY OF INVENTION

It is therefore a primary object of the current invention to provide a drill capable of drilling through difficult and hardened materials so that workpieces that have incurred broken drills, taps, dowel pins, etc., may be salvaged using conventional metalworking equipment.

It is another primary object to provide a starting drill that can start holes in almost any material and virtually any surface whether angular, radial, irregular or fractured.

It is still another object to provide a double ended starting drill in various point angles to match the included angle of various penetrating drills, i.e., 118°, 135°, 140°, etc.

And still another object is to provide a tool for reaming blind or thru holes to accurate sizes.

It is another object to provide a tool whose cutting edges may be renewed using a fixture and simple grinding equipment.

It is another object to provide a drill capable of drilling through brittle hardened materials producing a clean exit in the part.

It is yet another object to provide a starting drill whose surfaces may be easily renewed once dulled.

And yet another object is to provide a combination drill having a starting drill geometry at one end and a "finishing" drill at the other end so that each drill may be used to provide its own starting hole.

As still yet another object is to provide a drill that can be economically mass produced.

Again, another object is to provide a single sided drill geometry for machinable material which superimposes the starting drill geometry onto the drill to provide improved gyroscopic centering action for the drill—keeping it on course producing straighter holes in deep drilling applications.

Another object is to provide a drill geometry for a starting and penetrating drill that can employ a grade of carbide that may be diamond coated or that may be constructed from Technical Ceramics such as SiC whisker reinforced alumina.

The current invention preferably consists of a tungsten carbide drill. In sizes up to ¼", it may be produced from solid one piece carbide, for economic reasons, larger sizes may feature a carbide "insert" brazed onto a steel shank.

The starting drill geometry of the invention consists of a three (tri-chisel) or four-sided (quad-chisel) fluteless pyramid point on the end of a cylindrical or hexagonal body. The pyramid point is such that the "effective cutting angle" or dynamic point angle of the pyramid produces a conical female cone that essentially matches the included angle of the drill point to be used.

Included angles for drills may be anywhere from 90–160°. The pyramid point is thus provided in varying effective cutting angles to match this range of included angles.

The starting drill may be single or double ended and may also be provided on the back end of a particular drill. Additionally, the tool may be produced with a stepped diameter where excessive tool extension is required.

Several embodiments improve the performance of the pyramid point and make viable the construction of the drill from Technical Ceramic material such as SIC whisker reinforced Alumina and possibly other ceramics. This is achieved by an enhanced pyramid which employs a dual concentric pyramid point in addition to beveled corners of the pyramid increasing the strength of the cutting edges. A further modification may employ a notched pyramid for freer cutting action.

In another embodiment of the starting drill the tool may instead feature a drunken pyramid in which the apex of the pyramid is eccentric to the axis of the drill.

The pyramid point tools may also be used to ream holes. An embodiment for this application may feature an oil groove or spiral grooves on the circumference of the tool. Additionally the tool may have a coaxial blind or thru hole for the displacement of chips in reaming a blind hole.

The pyramid point may also be combined or superimposed on deep hole single sided HSS or carbide drill geometries to provide improved gyroscopic centering for these tools.

The penetrating drill portion of the invention consists of a single sided drill of uniform diameter having a short flute length with a tapered or radiused flute, the flute depth being approximately ⅓ of the drill diameter—making the tool a massive ⅔ diameter. The tool may be produced in right or left-handed versions. The included angle of the primary cutting edge may be a 0° beveled edge to a compound shallow angle disposed to provide gyroscopic guidance and produce a female conical cavity in the work. This edge may also feature a negative rake for maximum strength of the cutting edge. The opposite quadrant is relieved with a compound angle that is a greater angle than the primary cutting edge, to avoid rubbing on the work. In addition, a negative rake is produced along this edge, this negative rake angle is extended to produce a chisel point for cutting the center of the work while the primary edge is above the centerline. The heel of the drill may be relieved to clear the cut produced.

In another embodiment an axial knife edge may be incorporated along the side of the drill. Alternatively, the drill may feature a back tamer to avoid binding in a blind or thru hole.

In another embodiment of the tool the invention features a primary cutting edge which is (radiused) a segment of an arc. The radius of the edge being equal to or greater than the drill radius. This arc segment may feature a negative rake along its edge which extends to the centerline of the tool. Whether or not the radius cutting edge has a negative rake the radius is relieved up to the cutting edge making it free cutting. The relief blends into the body making a tapered transition to the tool diameter. The advantage of the circular cutting geometry is that it produces clean holes in brittle hardened material.

DETAILED DESCRIPTION OF THE INVENTION

Figure 1:
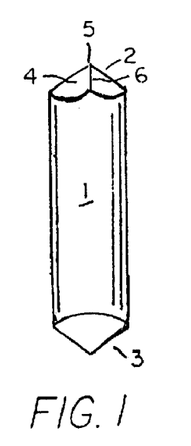
FIG. 1 is a plan elevation view of a preferred starting drill embodiment of the invention.
Figure 1A:
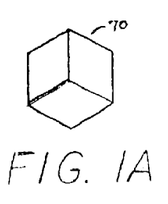
FIG. 1A is a head on view of another embodiment of the starting drill.
Figure 2:
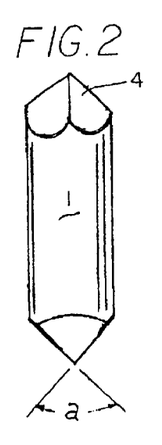
FIG. 2 is a plan elevation view of another embodiment of the starting drill embodiment of the invention.
Figure 3:
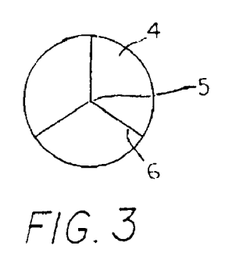
FIG. 3 is a head on view of the embodiment of FIG. 1.
Figure 4:
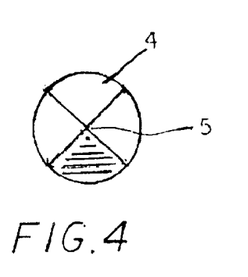
FIG. 4 is a head on view of the embodiment in FIG. 2.

Referring now to FIG. 1, one embodiment of the starting drill portion of the invention is shown. The starting drill is preferably constructed from tungsten carbide for its longer life and ability to drill almost any material, although other suitable drill materials may be used. As can be seen the drill (1) is produced from, straight, uniform diameter, cylindrical stock and may have the drill point ground on one (2) or both ends (3) of the tool. In this particular embodiment the drill point consists of three inclined planar surfaces (FIG. 3) (4) creating the cutting edges (6). In FIG. 2 is shown another embodiment of the starting drill. It is the same as the previous embodiment except that it has four inclined planar surfaces best seen in FIG. 4, spaced 90° apart that converge to a point at the center to form a true pyramid point. Another embodiment of the starting drill is shown in FIG. 1A. It is identical to the embodiment in FIG. 1 except the body (70) is made from a uniform hexagonal body. These drills resemble a nail point except the angle (a) (FIG. 2) is less acute as they are made to match the included angle of various drill points. In addition the intersection of the planes are such that it forms a sharp edge to make it capable of drilling by rotation of the tool. And it is essential the edges converge to a point, even a slight flat at the tip is detrimental to performance.

As drills go, the pyramid point is not as free cutting as more conventional drills and does not hold an edge particularly well. It is a negative rake tool, it requires more pressure to cut, and in hardened material, requires heavy pressure to cut. And in some materials it will produce a poor finish. However, as drill points go, this is perhaps the strongest geometry of any known point. It has tremendous edge strength and can survive interrupted cuts on a surface. As the tool is preferably made from tungsten carbide or ceramic, extremely hard but brittle materials, this geometry will not fracture as would more conventional geometries. The point has end mill characteristics, being able to cut on its periphery as well as from the center. As a result a starting hole may be started on inclined or angular, curved, irregular, or fractured surfaces as would be found on the remnants of a broken tap or screw. Normally, one tries to true the surface up by plunge cutting with an end mill.

However, in small sizes the interpreted cut will invariably fracture the end mill. The pyramid point typically survives and produce a conical recess for the penetrating drill to follow. The pyramid point can start holes in broken taps at least as small as a 4–40 thread and can enable starting a 1/16" diameter hole off the centerline of a hardened steel ball. Additionally, it is possible to "move over" an incorrectly positioned spotted hole by merely repositioning the table or work and redrilling.

Figure 10:
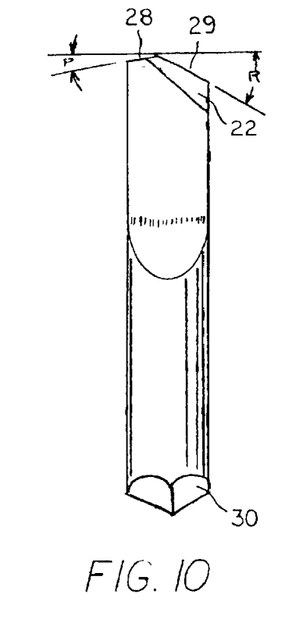
FIG. 10 is a plan elevation view of the penetrating drill embodiment of the invention.

Of the two basic embodiments (FIGS. 1&2) of the starting drill, the tri-chisel pyramid point (FIG. 1) has the advantage of being freer cutting than the quad chisel pyramid point. And since they have no flute they take up very little "real estate" so that this geometry may be placed on the back end of a particular drill (30) as shown in FIG. 10. While it is shown on the back of the drill disclosed herein, it should be understood it may be employed on other more conventional drill designs, as for example, the twist drill. In this instance the back end of the shank is induction hardened to make it suitable for drilling. Alternatively, a small length of carbide may be brazed to the back end of the shank, ground concentric, flush, and with a pyramid point. For small sizes, up to approximately 1/8" it is not a problem to install the drill "backwards". In larger sizes, a chuck or toolholder with deep throat capability is required as it is necessary to chuck the part on the shank and not the flutes when installed "backwards" for spotting a hole.

For a spotting drill to provide accurate guidance for the penetrating drill to follow, the female cone of the spotting drill should be in agreement with the included angle of the penetrating drill. The pyramid point will produce a true V profile female cone in the workpiece. This is not an exact match for a typical drill cone profile, which in most cases produces a truncated cone. This is quite acceptable (commerical center drills utilize a stepped pilot removing the center of the cone). It is essential that the penetrating drill make initial contact on the outer edges of the spotted cone, rather than at the center, for proper guidance of the penetrting drill. Ideally the spotted female cone should match the drill cone except for the flat at the tip. If there is an error it should be on the side of producing a steeper spotted female cone.

Figure 5:
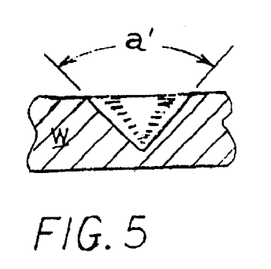
FIG. 5 is a cross sectional view of the profile cut by the starting drill shown in FIG. 2.

The included angle of penetrating drills vary on the material to be cut, from 90° to 160° being the most common. As indicated earlier, the pyramid point is made in varying angles FIG. 2 to match a particular drill's included point angle. However it should be noted that the angle of the pyramid point (a) FIG. 2 and the angle of the female cone (a') FIG. 5 produced in the workpiece (w) are not the same. It is thus the effective cutting angle or dynamic point angle to which the pyramid point is made. What's more the tri-chisel pyramid point and the quad-chisel pyramid produced to the same geometric point angles have different effective cutting angles. The effective cutting angles were determined empirically. For example, generating a point angle of approximately 53° from perpendicular on the tri-chisel pyramid results in a dynamic point angle that matches a 118° included point angle of a penetrating drill.

Figure 8:
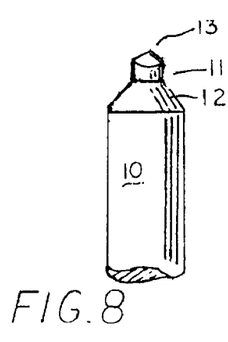
FIG. 8 is a plan elevation view of another embodiment of the starting drill having a stepped diameter.

In order for the starting drill to be effective, like an end mill or center drill, the tool should have a short extension for rigidity. Tool extension is normally limited to 2–4× the drill diameter. For applications like off center drilling of a sphere, tool extension should not exceed 2× the drill diameter. There are instances where this is not always possible, in this case a tool with a stepped diameter (10,11) FIG. 8 may be used. The transition between diameters is preferably angular (12) or radial for strength. The point (13) may feature either the tri-chisel or quad-chisel pyramid.

In cases where the starting drill is used to start holes on an angle or off the center of a radial surface, the spotting drill must be the same size as the penetrating drill. The tool may of course also be used in conventional applications (90° to a planar surface). In conventional applications the starting drill may be smaller, larger, or the same size as the finishing drill. A smaller drill can provide sufficient guidance for a drill approximately 50% larger in size, and a larger spotting drill can be used to leave a chambered edge around the hole. And of course the same size starting drill may be used as the finishing drill. It will be noted that superior drill guidance can be achieved if the same size starting and finishing drill are used however. If the female cone is peck drilled deeper than the full cone it will produce both radial and gyroscopic guidance for the drill to follow. Additionally, this technique may be used with an extended length starting drill to start a 90° hole down in a recess. Excessive tool projection violates sound machining practice. Even with the gyroscopic centering action of the tool point, the runout will produce a poor conical profile which will not provide accurate guidance for the drill to follow. However if the spotted cone is peck drilled deeper than the full cone, the walls of the hole offer additional support at the tip of the tool, and "clean up" any chatter or out of round condition, thus providing accurate guidance for the drill to follow.

The gyroscopic centering of the pyramid enables the tool to be utilized in a portable drill as well as stationary machine tools. Because it has end mill characteristics it performs better in moderately hard material where it "tracks better". In soft material lateral forces exerted by the user can make the tool "mill" off its mark.

It was expected that angular drilling would only be able to be performed in a stationary machine tool. Surprisingly, it was found this could also be done with a portable drill. This can be done in materials like hardwoods, brass and aluminum. It is achieved by bringing the tool to the work with the drill running and engaging the work while holding the drill firmly. The tool acts like a burr and once it starts to bite the work it will begin to track much like a hacksaw blade after it begins cutting into the work once a full cone is established the penetrating drill is used to finish the hole.

As previously indicated, the pyramid point angles are produced in a range of point angles. It should be noted the steeper the point angle the freer cutting the starting drill. The shallower the pyramid the stronger the edges, however it requires heavy axial pressure to cut. The 160° dynamic point angle will survive interrupted cuts in hardened metals whereas the 118° dynamic point angle will not. However, the 118° dynamic point angle will cut much easier in machineable materials and holds its edge well. While the edge will not fracture with the shallow point angle it does not hold an edge well. The reason for this is, as it is not free cutting the pressure exerted on the edge will cause it to wear faster than a free cutting tool. Additionally the heavy cutting pressure will promote chip welding and edge buildup that can prevent the tool from drilling. Lubrication, or cutting oils, and tool coatings such as titanium nitride or a host of others are beneficial to this end.

Figure 3A:
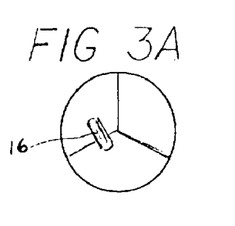
FIG. 3A is a head on view of a notched pyramid point embodiment.

To address this issue another embodiment of the pyramid point may be made as seen in FIG. 3A. The feature shown at 16 would appear to be a flaw in the tool—a notch made in one or more facets that is approximately at a right angle to the edge and extends thru the edge and is somewhat shy of the center. Paradoxically it improves the tool's performance. It is analogous to splitting the chisel point on a twist drill. The notched pyramid penetrates the work easier. Reducing the pressure on the edge extends tool life, reduces chip welding, and improves the surface finish in the workpiece.

Figure 9:
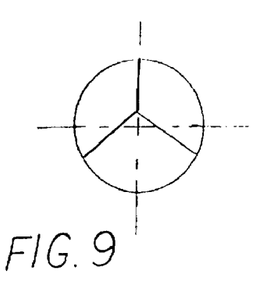
FIG. 9 is a head on view of an eccentric pyramid embodiment.

One object of the current invention is to enable construction of a drill from technical ceramics—materials that that can be harder but more brittle than tungsten carbide. A starting drill was constructed from a SiC whisker reinforced alumina grade WG-100 available from Greenleaf Corp. Sagertown Pa. The drill was made according to the embodiment in FIG. 1 and had a 118° dynamic point angle. It was found to be suitable to materials like brass and aluminum and could withstand peripheral cutting applications in these materials. However, attempting to drill a material like silicon bronze or cast iron, even in a center cutting application, would cause the point to fracture. If the tool were produced with the shallow angle pyramid (160° dynamic point angle) then even the ceramic tool can spot a cone in almost any material, however the cone angle is the wrong profile for most drills (the exception is the embodiment of FIG. 10). It is of course desireable to have the steeper more common point angles be able to drill materials other than brass and aluninum. As the tip of the pyramid is the weakest area of the structure, and since it is not involved in the guidance of the drill to follow, then modifications can be made to the pyramid point. One such embodiment is shown in FIG. 9 which is identical to the embodiment in FIG. 1 except that the pyramid converges to a point that is eccentric with the axis of rotation. In the concentric convergence of FIG. 3 the greatest pressure is applied to the weakest area of the pyramid where rotational speed approaches 0. The "drunken" eccentric pyramid moves the point to an area that has some rotational speed and the center of the work is cut by an area of greater strength. The profile of the female cone cut by this point is a W essentially a V cone that has a nib or miniature pyramid at its vertex. The degree of eccentricty is of course limited, as too large a nib at the vertex would interfere with the centering of the drill to follow, and it is only suitable for use in stationary machine tools.

Figure 6:
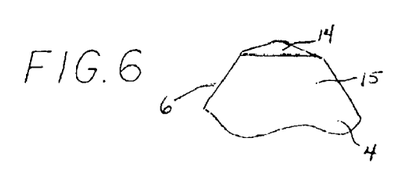
FIG. 6 is a segmented plan elevation view of a dual pyramid embodiment.

A preferred strengthened embodiment is shown in FIG. 6. This embodiment employs a dual pyramid point. The tip is ground at a shallow angle (14) that has great strength and the remainder (15) is ground to the steeper dynamic point angle of the drill.

Again, the size of the shallow pyramid is limited as it could interfere with the guidance of the drill to follow, and too large an area of the shallow pyramid portion offers high resistance to the drill's penetration into the work.

Figure 7:
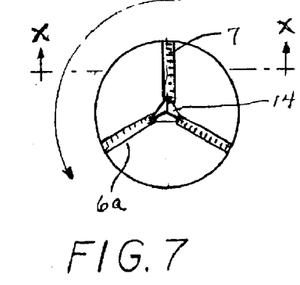
FIG. 7 is a head on view of a beveled edge dual pyramid.
Figure 7A:
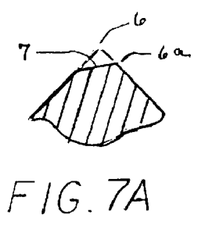
FIG. 7A is a sectional view along lines X—X of FIG. 7.

A further enhancement of the pyramid point may be made to the dual pyramid point as shown in FIG. 7. In this case the edges 6a of the pyramid are beveled, strengthening the edges of the pyramid. The beveling of these edges is analagous to a dual angle edge well known in the art. The bevel edge represents the secondary angle much as with a conventional end mill. Typically a 20° bevel is employed. A sectional view of the edge can be seen in FIG. 7a. It shows the original edge (6) in phantom lines, the beveled surface (7) and the new edge (6a) which as can be seen, has significantly more mass behind the edge. Thus all the weakest areas of the pyramid are strengthened. It should be understood that the dual pyramid may be eliminated and the beveled corners may instead extend the full length of the edge and intersect at the center.

Beveling the edges of the pyramid makes it a directional tool, it may be either right or left handed depending upon which way the edge is beveled. Whereas, in the embodiment of FIG. 1 the tool will cut regardless of the rotation of the tool.

The enhancements described above to the pyramid may be employed individually or they may be combined, for example a notched, dual pyramid with beveled corners.

When the WG-100 drill was modified with a dual pyramid point having beveled edges with a 118° dynamic cutting angle the tool could now drill the silicon bronze and cast iron workpieces which had previously fractured the tool. Even when cast iron was drilled at a 45° angle, the tool showed no damage to the edge. Another point was ground in the WG-100 material. The point was made to a 135° dynamic point angle (created by grinding the edges at approximately 42° from a perpendicular plane). The point was enhanced, utilizing a notched, dual pyramid with beveled edges. This point was successful in drilling silicon bronze, cast iron, mild steel, 304 stainless steel and annealed 0–1 oil hardening steel without damage to the tool. In this test holes were drilled at 90° to the work.

While the ceramic material could handle steel there was difficulty penetrating these materials. As high feed rates and axial pressure could cause tool failure, it would appear this material is well suited to the brass family, non-ferrous materials, and more importantly, cast irons, being capable of drilling thru the scale and into the irregular surface of a casting. As well as drilling at angles in this material, without the need to spot face the surface. Additionally, with the tool held in a collet the ¼" diameter tool was run as high as 4,000 RPM in cast iron and brass without problem. The material promises productivity and longer tool life in these applications.

While the fluteless pyramid point starting drill is designed for merely producing a female spotted cone in a workpiece, it may also be used to chamfer or countersink a smaller existing hole.

Figure 22:
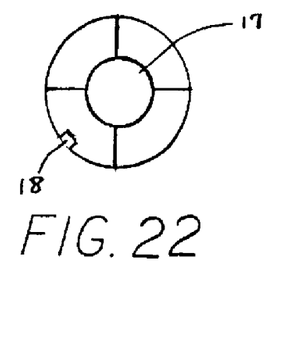
FIG. 22 is a head on view of a hollow pyramid reamer having an oil groove.

In addition, another application of the tool is reaming an existing hole to produce an accurate hole size. The existing hole size should be 0.005"–0.015" smaller than the pyramid reamer. However, since the application is limited to thru holes and since the friction of the tool body against the walls of the hole is an issue, an embodiment specialized for this application is shown in FIG. 22. Two modifications of the tool are made. An axial hole (17) approximately equal to ½ the tool diameter, which may be either a thru or blind hole, and an axial oil groove (18). Axial hole 17 accommodates displaced chips in blind hole reaming applications. If axial hole (17) is a thru hole, lubrication may be applied thru the center of the tool providing the spindle has provision for same. Alternatively, flood lubricant is used and an air blast can be utilized after reaming the hole to clear any chips so that the tool is ready for the next hole. The axial oil groove (18) may extend either the full length of the tool or for just the length of the tool that penetrates the work. Its function is to carry oil or cutting fluid between the bore and the body of the tool providing better hole quality.

Figure 23:
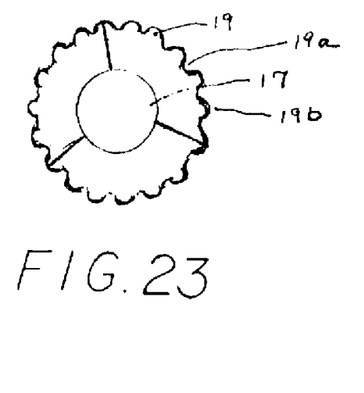
FIG. 23 is a head on view of another hollow pyramid reamer having spiral oil grooves.
Figure 24:
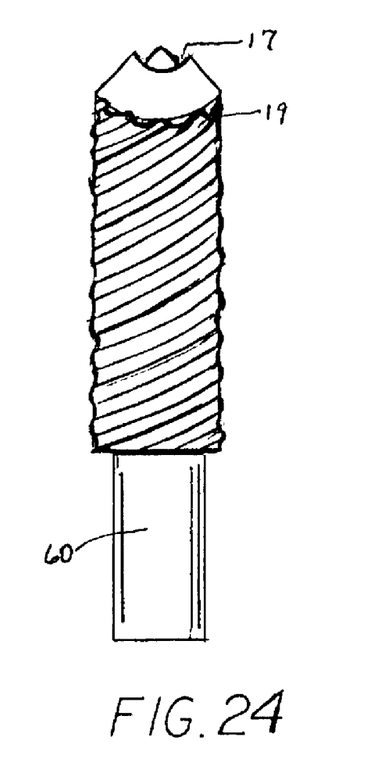
FIG. 24 is a plan elevation view of the embodiment in FIG. 23.

Another embodiment of the pyramid reamer is shown in FIGS. 23, 24. It has an axial hole (17) as with the previous embodiment. However, instead of an axial groove on the O.D. the body consists of a series of spiral grooves (19), as is available from Duramet Carbide, Warren, Mich. The profile of the groove is essentialy semi-cylindrical with the crest of the tool (19a) being the bearing surface and the valley (19b) providing the oil path. In practice the crest (19a) is ground cylindrical and concentric with the axis and to the desired diameter. The number of grooves are a multiple of 3 or 4 so that the facets of the pyramid point will be such that the edges of the pyramid bisect the crest 19a of the spiral groove so it will cut the full diameter of the tool. A section of the tool (60), FIG. 24 may be cylindrically ground concentric with the axis to a smaller diameter for chucking the tool. The resharpening of the pyramid pointed tools is a simple matter with a fixture one only need tilt the table of a bench grinder or sander and grind each facet to a stop, indexing the part 90 or 120°, and repeating the operation. Points can be placed on drills at least as small as 0.005".

Referring now to FIG. 10, which is the penetrating drill portion of the invention. For hard drilling applications the drill is made from tungsten carbide. Because of the robust construction, the drill may employ a Valente WA-2 grade in which the cobalt content does not exceed 6%. This grade is suitable for diamond coating by Crystallume, Calif., or SP3, Calif. Construction of the penetrating drill from WG100 or WG-300 SiC whisker reinforced alunima appears viable and possibly from other ceramics such as silicon nitride or silicon carbide. With further advancement in the coating process, and with the use of these advanced materials, the application, performance, and benefits of same can only be speculated on at this time. Whereas, tungsten carbide or coated (T.I.N.) carbide, offer demonstrable benefits in the penetrating drill portion of the invention.

Figure 11:
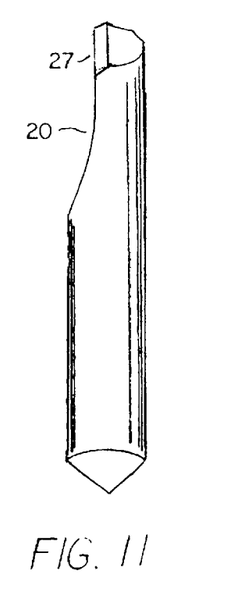
FIG. 11 is a side view of FIG. 10 showing a radial flute.
Figure 12:
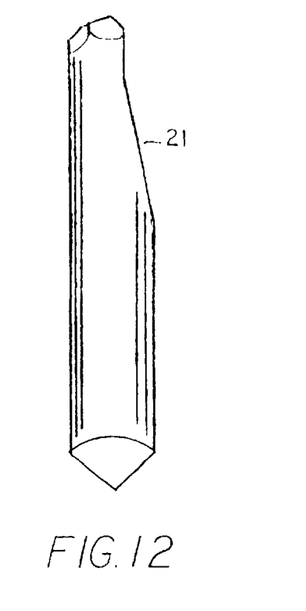
FIG. 12 is the opposite side view of FIG. 10 illustrating a tapered flute.

As can be seen in FIG. 10, 11, 12, the drill consists of a straight uniform diameter single sided drill having a short flute either radial (20) or angular (21) in construction, with a depth of approximately ⅓ the drill diameter. And with a shallow primary cutting edge (28) inclined to produce a conical cut with a steeper relief (29) on the opposite quadrant that has a negative rake on its edge. And while the relief edge may be made to differing angles than my previous disclosure, these features are all within the scope and spirit of U.S. Pat. No. 6,030,156.

Figures 13, 14, 15:
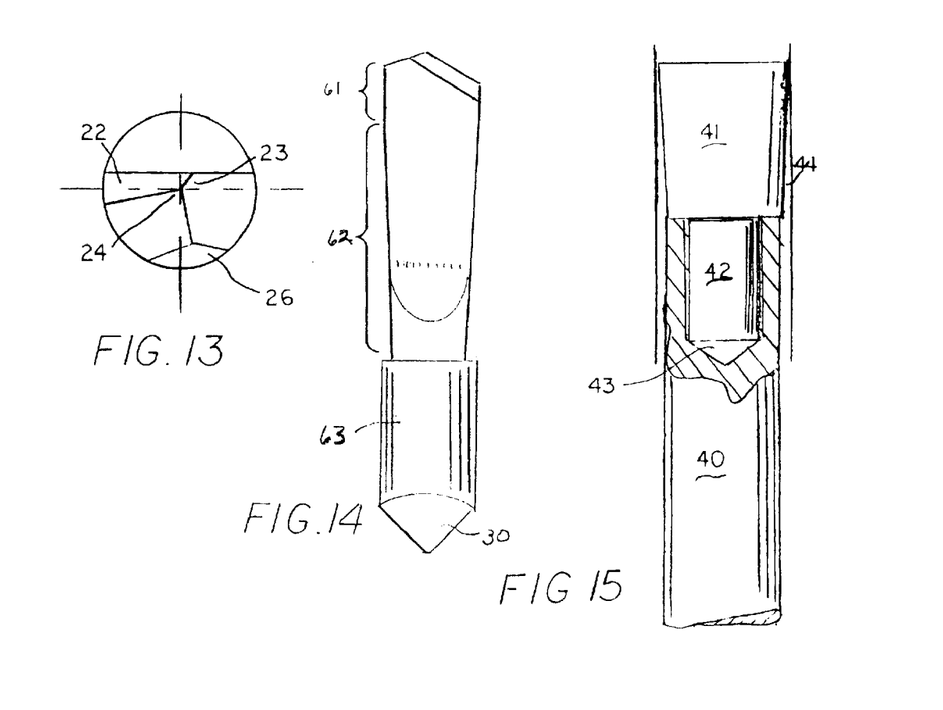
FIG. 13 is a head on view of FIG. 10.
FIG. 14 is a plan elevation view of a back tapered penetrating drill embodiment.
FIG. 15 is a plan elevation view partly in section showing construction of a brazed assembly for producing the drill.

A significant difference from the previous disclosure is the elimination of the land at the tip that creates a step from the ⅔ diameter to the centerline of the tool. As the cutting tool edge was above the centerline the step to the centerline insured all the material would be drilled leaving no area uncut. In the current disclosure the chisel point 23, FIG. 13 is created by additional grinding of the negative rake relief angle 22. The tool may be ground such that the three facets all converge at the geometric center 24 of the drill. There is latitude in the point geometry. Depending on the chisel edge convergence the drill will produce either a truncated conical profile or a W profile with a nib at the center. This embodiment has several advantages first it increases the strength of the cutting tool and it relaxes the tolerance in the manufacture of the tool by eliminating the step which must be exactly on the centerline. This is especially true in small sizes where tolerances become very tight.

The requirements of a small diameter deep hole drill and a drill capable of drilling hard materials are very similar. The current modifications have enabled the successful application of tungsten carbide construction. Tungsten carbide is the hardest metal in existence. High hardness is a necessary property to be able to cut hardened steel. However, while hard, it is also brittle and it fractures easily especially in small sizes.

Because of this, conventional carbide drills have not had much success in drilling out broken taps. Just as glass is a brittle material, it is well known a beer mug will survive greater abuse than a champagne glass. Because the drill is a single point and employs a full ⅔ (27) tooth, it has much greater mass behind the cutting edge as compared to other drill geometries.

In one embodiment FIG. 10, as viewed from the top plane, it is preferred to produce angle P at 10° and the relief angle R at 20–30°. The compound angle of the primary cutting edge P is 15–20° and the compound angle of relief angle R, is 20–30° The heel of the drill may be relieved at 26 to insure the drill clears the cone cut by the tool. The negative rake along the relief angle is equal to, or 5° greater than the relief angle, with the compound angle being 30–45°.

The primary cutting edge of the cutting tool may also have a negative rake on it. While it does not cut as freely as a 0° top rake, it does provide a stronger edge than can better survive the interupted cuts that would be experienced, as for example, in drilling out broken taps or drills.

In drilling solid workpieces it has been found this particular embodiment tends to produce tapered or bell mouth holes in hardened workpieces. Furthermore, the bottom of the hole may be smaller than the drill which can result in torgue failure of the tool. Because of this, blind holes are limited to 3–4 times the drill diameter. Additionally the point geometry and heavy cutting pressure usually results in bullet hole exits. As this particular embodiment is primarily for reclaiming workpieces having a broken drill or tap, these limitations are not an issue. As you are destroying the tap remnant, there is no hole depth, and the exit is irrelevant. And in machinable material these results are not observed.

Figure 25:
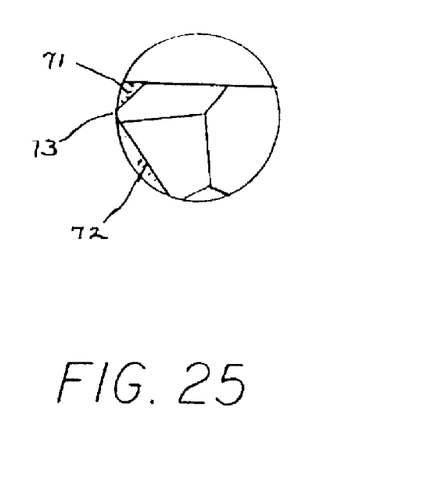
FIG. 25 is a head on view of an axial knife edge embodiment of the penetrating drill.

However, as it is desirable to be able to drill deeper holes and thru holes in hardened workpieces, several other embodiments address these issues. These modifications depart from the scope of U.S. Pat. No. 6,030,156. Shown in FIG. 25 is the drill of FIG. 10 which has an axial knife edge that extends for most of the flute length. It is created by angular surface (71) and (72) that are typically ground at 30° from the horizontal plane until they meet at the centerline. It is preferred that the surfaces are ground just shy of meeting—leaving a small radial land (73) that may be 0.005–0.010" in width. This modification seems to improve, but does not eliminate the problem, however, it appears to reduce the axial pressure required to penetrate the work, which makes it beneficial for that reason alone.

As the knife edge of the FIG. 10 embodiment is not effective, possibly because cutting hard metal requires high cutting pressure, and as the effectiveness of the axial knife edge is questionable, another embodiment for producing deeper holes is shown in FIG. 14.

The tool is the same as that in FIG. 10, except that the tool has a back taper of 0.001"–0.005"/in. As shown, the tool preferably has a cylindrical land (61) of a uniform diameter, which represents the drill size, for approximately ½–1 diameter in length. This insures a number of resharpenings without changing the size of the drill. The back taper (62) (shown exaggerated) promotes freer drilling, reduces the friction and heat generated, and prevents torque failure. While the hole may still be tapered, the drill will not bind in the hole as its diameter is smaller behind the cutting edge. The shank portion (63) is a uniform cylindrical section for chucking the tool. Alternatively, the back taper may extend the entire length of the tool.

Another embodiment for achieving deeper holes in hardened materials is simply to change the shallow primary cutting edge angle at P to a 0° beveled edge. The beveled edge typically being 20°. In hard material this drill is more difficult to start and the spotted cone of the starting drill should be peck drilled deeper than the full cone so the drill is guided more by the radial surface rather than the conical surface. Surprisingly, for reasons that are not apparent, the use of this tool produced holes with little or no taper in hardened metals and the hole size was close to the drill size. A 45°×20° bevel at the corner of the primary edge improves tool life and enables easier starting of the drill.

Another change over the previous patent disclosure is the addition of the pyramid point on the back of the tool (30). As broken taps or drills rarely make a clean break it is essential that a drill be able to start on such a surface. The irregular hardened surfaces represent what would be the most difficult application for a carbide tool. The pyramid point on the back of the tool is utilized to start the hole and the penetrating drill to finish the hole.

Another embodiment of the tool is shown in FIG. 15, it features brazed construction. Carbide is expensive, small sizes 0.015" up to ¼" in diameter can be economically produced from solid carbide drill blanks. To conserve material and lower cost, sizes over ¼" may utilize a carbide blank insert brazed onto a steel shank 40. The carbide perferably has a stepped diameter shown at 42 which locates in a center drilled hole 43 in shank 40. This provides a strong joint as well as locating the blank essentially concentric with the shank. The shank 40 may be a smaller diameter than the carbide insert 41 and the carbide may be ground concentric with the shank and with a back taper 44 which prevents the drill from binding in the hole. The cutting face and flutes are then ground into the carbide/steel in accordance with the current invention. It is also possible to secure the material by shrink fit to the shank where the heated (expanded) shank is placed on the stepped diameter 42, upon cooling it "shrinks" to a smaller size securing the blank. This is more applicable to securing ceramic tipped blanks.

The resharpening of dulled or fractured edges of this embodiment is readily accomplished with the use of a fixture preferably of the types described in U.S. Pat. No. 6,030,156. With the tool clamped in the fixture primary and relief angles can be ground on a carbide bench grinder with a silicon carbide or preferably a diamond wheel which has a tilting table and miter gage. Sizes ⅛ and smaller can be "hand-sharpened" with the aid of a belt sander, setting the compound angle for the cutting edge by tilting the table and adjusting the miter gage, and by affixing a diamond lap (such as manufactured by E-Z Lap Co.) to the platin by use of magnetic tape. In this case one strokes the tool against the diamond lap, it has the advantage of low cost and simplicity and can actually offer greater control in small sizes as one can merely limit the number of strokes against the lap. With a rotating grinding wheel it is easy to accidently "overgrind" the edge. The negative rake angle 22 along relief angle R is ground by turning the fixture on its side and setting the angles for the compound angle. And relief 26 is accomplished by tilting only the miter gage and again turning the fixture on its side. Thus the drills made in accordance with the current invention can be kept in sharpened condition on simple, inexpensive equipment.

As indicated earlier, the embodiment of the invention described thus far is basically for blind holes or for through holes where the object is to remove a broken tool to reclaim the part. The reason for this is that hardened materials may be classified as brittle materials. The point angle and heavy feed pressure used to cut this material usually results in bullet-hole type exits.

Figure 16:
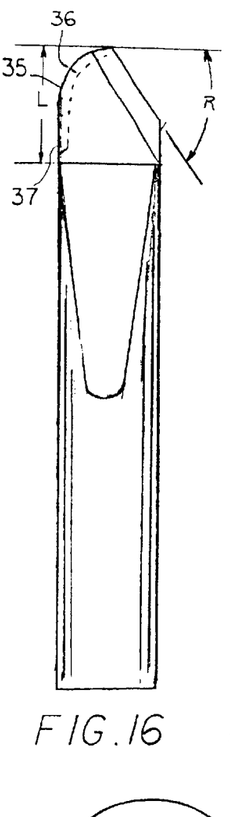
FIG. 16 is a plan elevation view of the radiused cutting edge embodiment of the invention.
Figure 17:
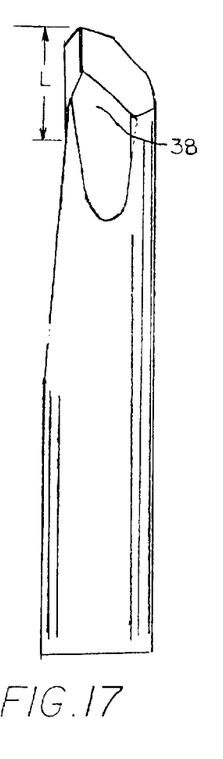
FIG. 17 is a view of the right side of FIG. 16.

There are applications where thru holes in hard material with clean exits are required. As indicated in my previous U.S. Pat. No. 5,516,242, a circular or a radiused cutting edge geometry is employed for brittle material. Shown in FIG. 16 is another embodiment of the current invention. The features of this embodiment are the same as previously indicated except that the primary cutting edge consists of a radiused edge (35). This tool will produce clean exits in hardened steels and other brittle materials. The tool features circular relief (36) up to the ⅔ tooth making an effective cutting edge. The cutting radius is the same size or larger than the tool's radius. The circular relief (36) makes a tapered transition (37) to the tool's diameter. The relief angle R is steeper than the previous embodiment and has an additional relief ground at (38) (FIG. 17) forming a prismatic countercutting edge which at this steeper relief angle would blend off into an ineffective radius at the edges. It is typically generated 10 degrees to the axis and 20 degrees to the ⅔ flute plane.

The flute tapers to a land L for a length greater than the cutting radius which remains at the ⅔ drill diameter. This provides some tool life enabling regrinding of the edge where the tool becomes worn. The primary cutting edge radius may also have a negative rake along its edge which may extend to the centerline of the tool as seen in FIGS. 19 and 20.

Additionally it should be understood that the embodiment of FIG. 16 may also employ the modifications described and illustrated in FIGS. 14 and 25.

Figures 18, 20, 21:
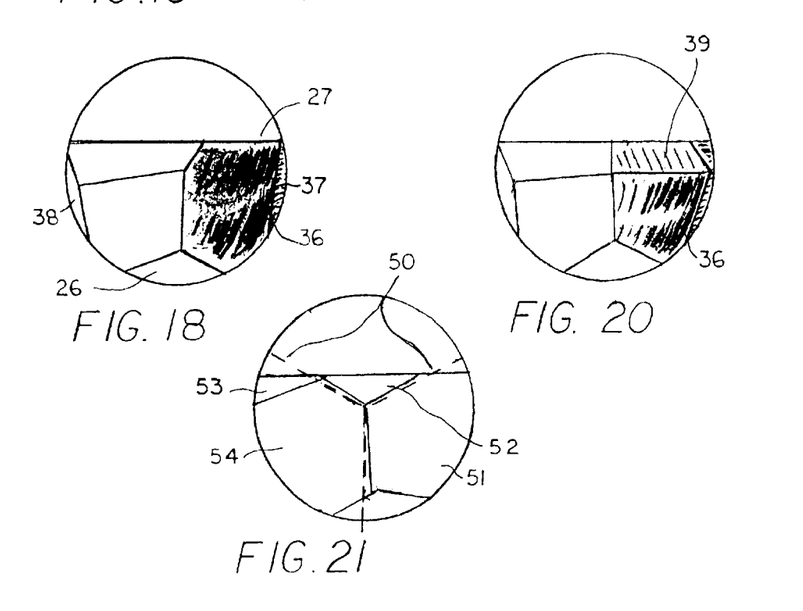
FIG. 18 is a head on view of FIG. 16.
FIG. 20 is a head on view of FIG. 19.
FIG. 21 is a head on view of FIG. 10 showing the superimposed pyramid point embodiment of the invention.
Figure 19:
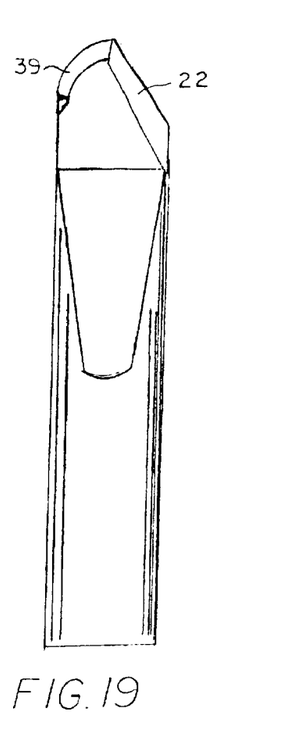
FIG. 19 is a plan elevation view of the radius cutting edge embodiment having a negative rake along the cutting edge.

Still another embodiment of the tool is shown in FIG. 21. This embodiment is directed towards the drilling of deep holes in machinable materials. This embodiment employs the features found in the embodiment in FIG. 10 except it has a much larger flute length (from 8–12 times the tool diameter) and it combines the pyramid point onto the cutting face. The edges of this tri-chisel pyramid point are seen as dotted lines (50) superimposed on the ⅔ cutting tooth.

The primary cutting tooth may be one facet of the pyramid or it can be relieved further in a compound angle but shy of the residual pyramid (52). Countercutting edge (53) and relief quadrant (54) are similarly relieved shy of residual pyramid (52). The advantage of this superimposed geometry is that it offers improved gyroscopic centering action to produce straighter holes particularly in small deep holes. The ⅔ flute of the tool offers guidance by virtue of its body with the conical point producing centering of the tool. However, as it is a single point tool, the cutting forces are unbalanced and can cause tool drift over long distances. The residual pyramidal point offers true gyroscopic action at the point to keep the tool centered.

I claim:

1. A rotary cutting tool for spotting starting holes, said cutting tool comprising a uniform cylindrical diameter and a fluteless pyramid point produced by one of 3 or 4 planar inclined surfaces converging to a point central with the axis with a dynamic cutting angle to essentially match the profile of included drill point angles from 90°–160°.

2. A rotary tool for spotting starting holes incorporated on the back of a shank end of a drill, wherein the drill and shank are approximately the same size, said tool comprising a fluteless pyramid point produced by one of 3 or 4 planar inclined surfaces converging to a point central with the axis and having a dynamic point angle essentially matching an included point angle profile of a penetrating drill.

3. A rotary cutting tool as in claim 1 wherein the tool has a reduced stepped diameter, said stepped diameter having said pyramid point.

4. A rotary cutting tool as in claim 1 wherein the said pyramid point comprises edges, wherein said edges are beveled along their entire length to create a stronger cutting edge.

5. A rotary cutting tool as in claim 1 wherein the tool comprises a dual pyramid point, a shallow pyramid at the tip and a steeper pyramid for the remainder of the inclined surface, said steeper pyramid having beveled edges creating a stronger cutting edge.

6. A rotary cutting tool as in claim 1 wherein said pyramid point comprises at least one facet, said facet comprising at least one edge and a notch shy of the center which extends through said edge of said facet.

7. A rotary cutting tool as in claim 5 wherein said pyramid point comprises at least one facet, said facet comprising at least one edge and a notch shy of the center which extends through said edge of said facet.

8. A rotary cutting tool according to claim 1 wherein the tool is constructed from at least one technical ceramic.

9. A rotary cutting tool according to claim 1 wherein said tool is pointed on both ends.

10. A rotary cutting tool according to claim 9 wherein said tool has identical point angles on both ends.

11. A rotary cutting tool according to claim 9 wherein said tool has different point angles on both ends.

12. A rotary tool according to claim 2 wherein said shank of said drill comprising a high speed steel construction, wherein said pyramid point is hardened.

13. A rotary cutting tool according to claim 2 in which the fluteless pyramid point consists of a carbide member brazed to the high speed steel shank.

14. A rotary tool according to claim 2 wherein said shank of said drill comprising a carbide construction.

* * * * *